(12) United States Patent
Bauer

(10) Patent No.: US 8,336,850 B2
(45) Date of Patent: Dec. 25, 2012

(54) STOP VALVE

(75) Inventor: Wolfgang Bauer, Weinheim (DE)

(73) Assignee: Deere & Company, Moline, IL (US)

( * ) Notice: Subject to any disclaimer, the term of this patent is extended or adjusted under 35 U.S.C. 154(b) by 344 days.

(21) Appl. No.: 12/784,038

(22) Filed: May 20, 2010

(65) Prior Publication Data
US 2011/0062360 A1    Mar. 17, 2011

(30) Foreign Application Priority Data

Jul. 24, 2009 (DE) .......................... 10 2009 028 008

(51) Int. Cl.
*F15B 13/04*    (2006.01)

(52) U.S. Cl. ..................... 251/94; 137/505.13; 251/285; 251/287

(58) Field of Classification Search .................. 137/455, 137/461–463, 465, 485, 487–488, 494–495, 137/505.13; 251/28–29, 32, 42–45, 60, 94, 251/284–288, 304
See application file for complete search history.

(56) References Cited

U.S. PATENT DOCUMENTS

| | | | | |
|---|---|---|---|---|
| 411,041 A | * | 9/1889 | King et al. ................... | 137/465 |
| 1,222,397 A | * | 4/1917 | Hamilton ....................... | 251/94 |
| 1,984,828 A | * | 12/1934 | Fornwalt ........................ | 251/94 |
| 2,234,795 A | * | 3/1941 | Brown ......................... | 137/637.1 |
| 2,412,105 A | * | 12/1946 | Sutton ............................ | 137/462 |
| 2,523,826 A | * | 9/1950 | Heinzelman ................... | 137/487 |
| 2,611,218 A | * | 9/1952 | Paulsen ......................... | 137/485 |
| 3,165,121 A | * | 1/1965 | Strauss et al. .................. | 251/94 |
| 3,228,417 A | * | 1/1966 | Schwerter ..................... | 137/461 |
| 3,972,398 A | * | 8/1976 | Chamberlain ................. | 251/94 |
| 4,493,473 A | * | 1/1985 | Rexer ............................ | 251/42 |
| 5,348,036 A | * | 9/1994 | Oksanen et al. ............. | 137/488 |
| 5,709,239 A | * | 1/1998 | Macalello et al. ............ | 137/465 |

* cited by examiner

*Primary Examiner* — John Bastianelli

(57) ABSTRACT

A stop valve is provided for a hydraulic system. The stop valve includes a valve slide that can be moved to a closed position and to an open position. A blocking device for limiting the activation of the valve slide is provided at an intermediate position located between the closed position and the open position, wherein, in this intermediate position, the opening cross section of the stop valve equals only a fraction of the opening cross section present in the open position. The blocking device is constructed such that limiting the activation of the valve slide by the blocking device is realized as a function of a pressure difference value between a pressure in front of and a pressure behind the stop valve, wherein the limiting can be canceled when the value falls below a given pressure difference value. This guarantees a pressure balance controlled according to the flow when the stop valve is opened.

8 Claims, 4 Drawing Sheets

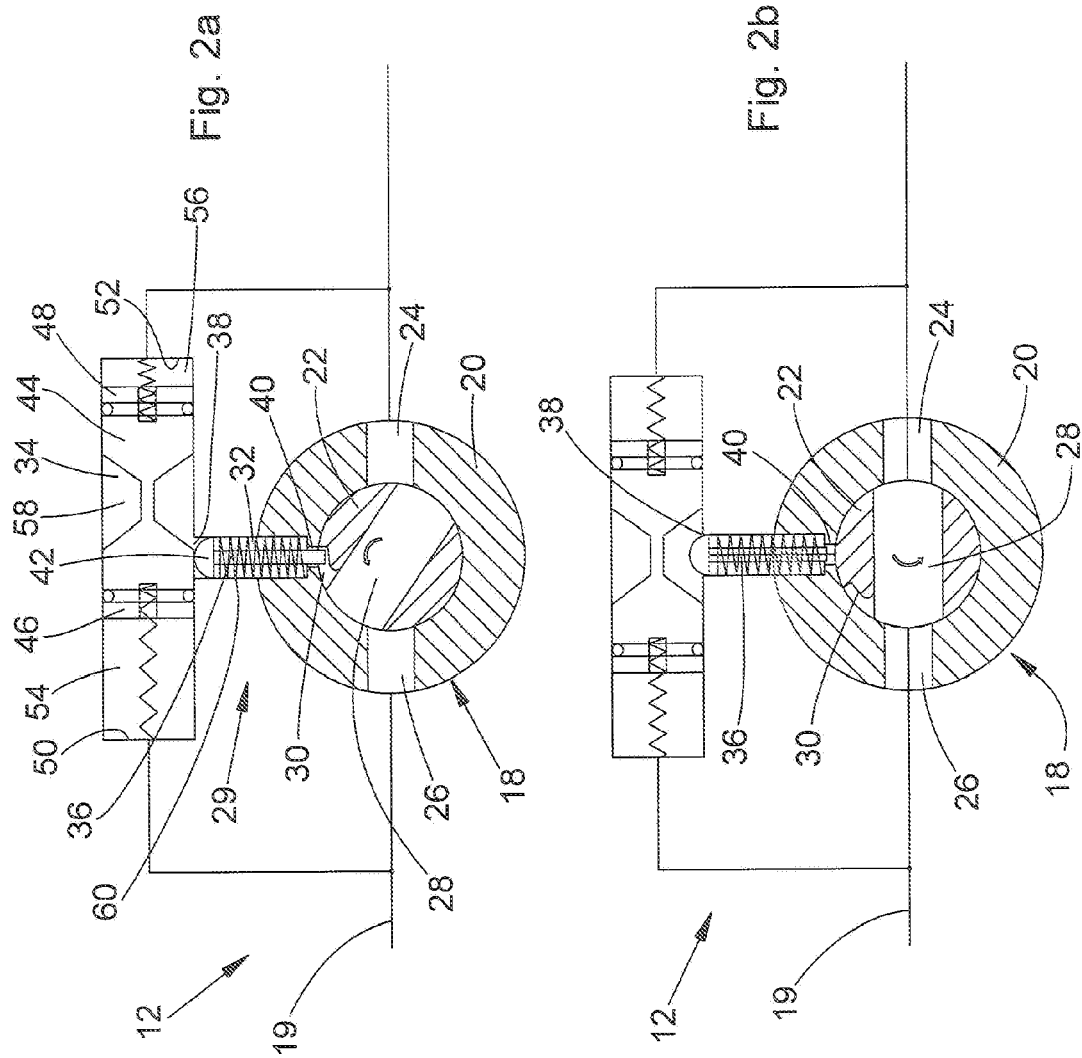

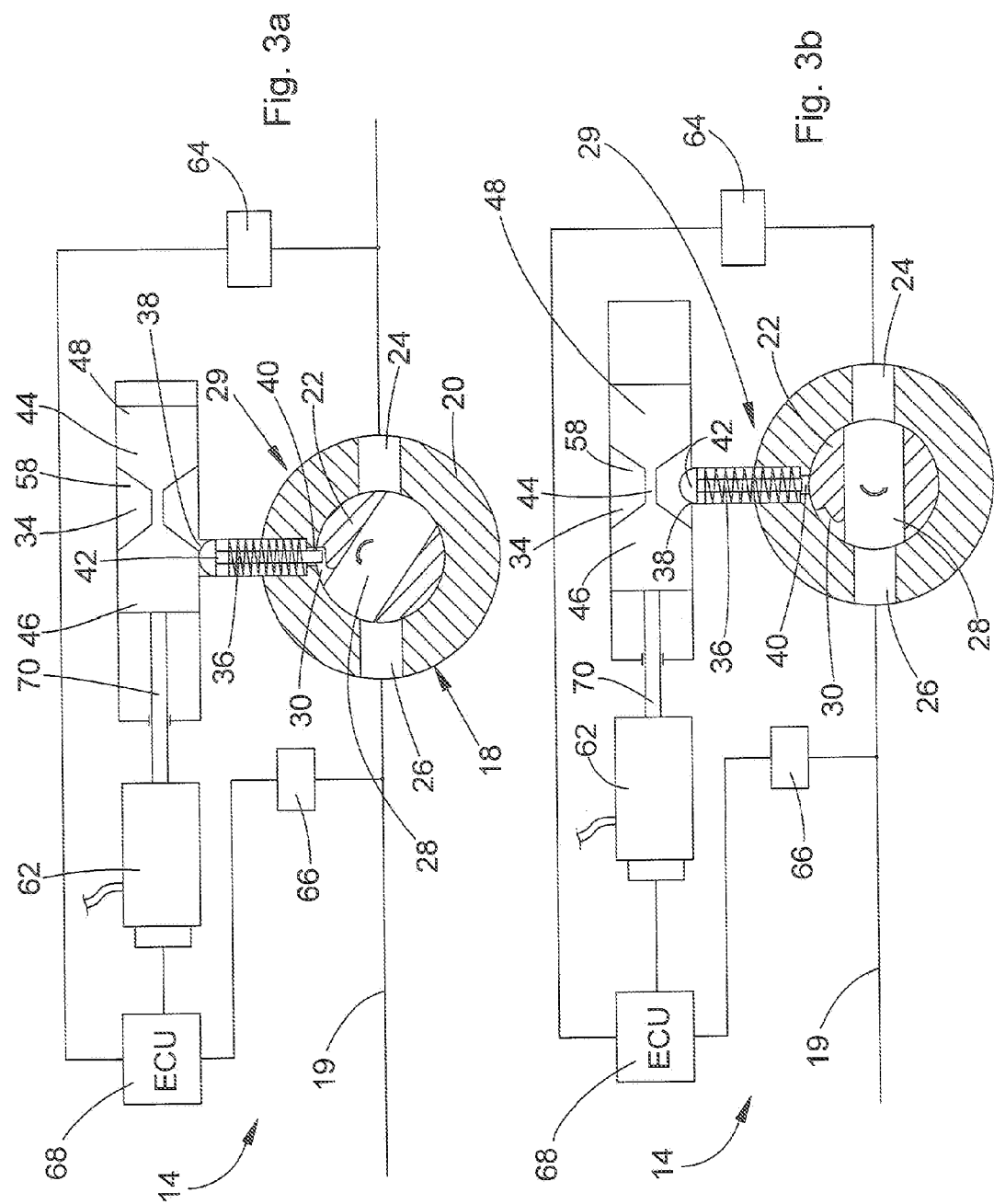

STOP VALVE

FIELD OF THE INVENTION

The present invention relates to a stop valve for a hydraulic system, with a valve slide that can be activated for setting a closed position and an open position.

BACKGROUND OF THE INVENTION

Stop valves, in particular, ball valves or stop cocks, in particular ball cocks, are used to selectively stop or allow a hydraulic flow. The valves are operated typically by a lever that can be rotated by 90°. In many cases, in the stopped state, a pressure difference builds up between the connection sides of the stop valve, whereupon, when the stop cock is opened, the hydraulic system tries to reach a pressure balance, which is associated with an abrupt, rapid step-wise increase in hydraulic flow. These step-wise changes are often undesired. Particularly in the case of agricultural machines, such as, e.g., tractors or harvesting machines, this pressure-balancing process in hydraulic suspension systems causes a quick, jerk-like motion of the suspension cylinder and thus also of the chassis and the tools installed on the chassis. The higher the pressure difference was in the stopped state, the greater is the movement.

Typically, stop valves can be opened in one pull, so that the complete opening cross section is freed directly. Indeed, the operator can try to open the stop valve in increments, but this is often possible only with much difficulty, especially due to high opening forces and the breaking away of the stop valve slide known as the stick-slip effect and rarely can be reproduced reliably. For this reason, usually unintentionally, a relatively large cross section is immediately opened, whereupon pressure equalization or pressure balance is achieved in sudden bursts and with the negative consequences named above.

SUMMARY

Accordingly, an object of this invention is to provide a stop valve which prevents a quick, jerk-like motion of the suspension cylinder.

A further object of the invention is to provide such a stop valve which can be opened incrementally.

These and other objects are achieved by the present invention, wherein a stop valve is provided with a blocking device for limiting the activation of the valve slide to an intermediate position located between the closed position and the open position, wherein, in this intermediate position, the opening cross section of the stop valve equals only a fraction of the opening cross section provided in the open position. The blocking device is constructed such that the limiting of the activation of the valve slide by the blocking device is realized as a function of a pressure difference value between a pressure in front of and a pressure behind the stop valve, wherein the limiting can be canceled when the value falls below a given pressure difference value. In this way, a stop valve is created with a blocking device through which, in the case of high pressure differences, a pressure equalization or a pressure balance and resulting dynamics in the hydraulic system are brought to a controlled, steady level. Only when the pressure is balanced or the value falls below a given pressure difference value is the stoppage or the limiting of the activation of the stop canceled, allowing the stop valve or the hydraulic system to be operated with a provided low flow resistance in the completely open position of the stop valve.

The stop valve includes a blocking device with a blocking element that can be moved into engagement with the valve slide or with a valve slide element connected to the valve slide, in order to limit the activation of the valve slide in the direction of the open position to the intermediate position. The blocking element can be constructed here in many ways and can be engaged with the valve slide or with a different component that is coupled with the valve slide and therefore can block an activation of the valve slide or can limit it to a specified degree.

The valve slide can be constructed as a rotary slide valve, for example, in the form of a rotating cylinder, and can be moved by rotating from a closed position into an open position or intermediate position. Here, a rotating mechanism is limited or blocked by the blocking element accordingly. However, it is also conceivable to limit a valve slide that can be displaced in a line in the way named above, so that displacement is blocked or limited.

The stop valve can be constructed in the form of a ball valve and the valve slide can be constructed as a rotating ball-valve slide, wherein this can be moved by rotating from a closed position into an open position or intermediate position.

In the case of a valve slide that can be displaced in a line, the mentioned positions can be reached through linear displacement accordingly.

The blocking element can be adjusted by an adjustment piston controlled hydraulically as a function of the pressure difference, wherein the blocking element can be moved by the adjustment piston into a blocking position in which the blocking element engages with the valve slide or with a valve slide element connected to this valve slide and limits the activation of the valve slide in the direction of the opening position to the intermediate position. The adjustment piston could also be moved electronically, for example, electromechanically, wherein it would be controllable, for example, by means of the pressure-detecting sensors (pressure sensors) and a corresponding electronic control unit generating a control signal and by these controlled electromagnetic adjustment means, for example, magnetic coils. An adjustment piston that can be controlled by electrical adjustment means instead of by magnetic coils, for example, by a servomotor or a step motor, would also be conceivable.

Instead of an adjustment piston, the direct control of the blocking element is also conceivable. The blocking element could be adjustable, for example, directly (without control piston) by adjustment means that are controllable electronically as a function of the pressure difference, wherein the blocking element can be moved by the adjustment means into a blocking position in which the blocking element engages with the valve slide or with a valve slide element connected to this valve slide and limits the activation of the valve slide in the direction of the open position to the intermediate position. The control can be realized here in a similar way with an electronic control connected to sensors. Here, the use of electromagnetic switching coils would also be conceivable that move the blocking element as a function of pressure sensors and an electronic control unit generating a control signal into a blocking position.

With respect to the blocking element, this can be constructed, for example, as a lock bar. Furthermore, a recess or cutout could be provided on the valve slide or on the valve slide element, for example, in the form of a circular or ring section groove that is constructed on the valve slide and in which the blocking element or the lock bar engages and blocks further rotation of the valve slide in the direction of the opening position past the intermediate position. The valve slide element can be further constructed as a circular disk on which a recess is provided that is constructed across part of its periphery and in which the lock bar engages and blocks further rotating of the valve slide in the direction of the open position past the intermediate position. The limiting of the valve slide can be preset or specified by means of the position and size of the recess. According to the arrangement of the recess on the valve slide or on the periphery of the circular disk, the blocking element engages with respect to a rotational angle or peripheral section of the valve slide or the circular disk at an advanced or retarded position, so that the activation angle that is achieved is smaller or larger when the valve slide rotates until the intermediate position is reached.

The stop valve described above is used, for example, in hydraulic systems for agricultural vehicles on which one or more different hydraulic loads must be supplied. Such agricultural vehicles are, for example, tractors or haulers, but also harvesting machines, such as combine harvesters or field choppers. Other agricultural vehicles, such as loader vehicles or crop-protection machines could also be supplied by means of such hydraulic systems. Furthermore, a stop valve according to the invention could also be suitable for hydraulic systems, such as, for example, in construction machines and forestry machines and could be provided for the purposes named above. A stop valve according to the invention could also be suitable equally for pneumatic arrangements that can be used on the vehicles named above.

The stop valve according to invention mentioned above is only partially opened from the blocked state (closed position) as long as the pressure difference between the two sides of the stop valve lies above a certain measure or pressure difference value. This is performed, for example, such that, due to the pressure difference, a control piston or adjustment piston is brought into a certain position in which a blocking element in the form of a lock bar or a detent pawl can lock in a recess on a valve slide or, for example, a cam disk or circular disk connected to the valve slide. The cam disk or circular disk is fixed on the valve slide, wherein the locking of the detent pawl then limits the possible opening angle of the slide. In this way, the high pressure difference can be lowered. The small opening permits only a small volume flow and the affected components in the hydraulic system move slowly during the pressure balancing. As soon as the pressure difference has fallen below a limit, the control piston or adjustment piston is moved back into a position in which the lock bar or the detent pawl disengages from the cam disk or the circular disk and the valve slide can be moved again across the entire adjustment range, that is, can also be completely opened. In this example, it was also considered, among other things, that pressure differences lead to locking of the detent pawl in both directions and that the mechanism can be easily integrated into the designs of stop valves or stop ball cocks that are typical today.

BRIEF DESCRIPTION OF THE DRAWINGS

FIG. 2a is a hydraulic system schematic diagram of an embodiment of a stop valve according to the invention in an intermediate position with hydraulically controlled blocking device;

FIG. 2b is a hydraulic system schematic diagram of the embodiment according to FIG. 2a with the stop valve in an open position;

FIG. 3a is a hydraulic system schematic diagram of an additional embodiment of a stop valve according to the invention in an intermediate position with blocking device controlled electronically;

FIG. 3b is a hydraulic system schematic diagram of the embodiment according to FIG. 3a with the stop valve in an open position;

DESCRIPTION OF THE PREFERRED EMBODIMENT

Figure 1:
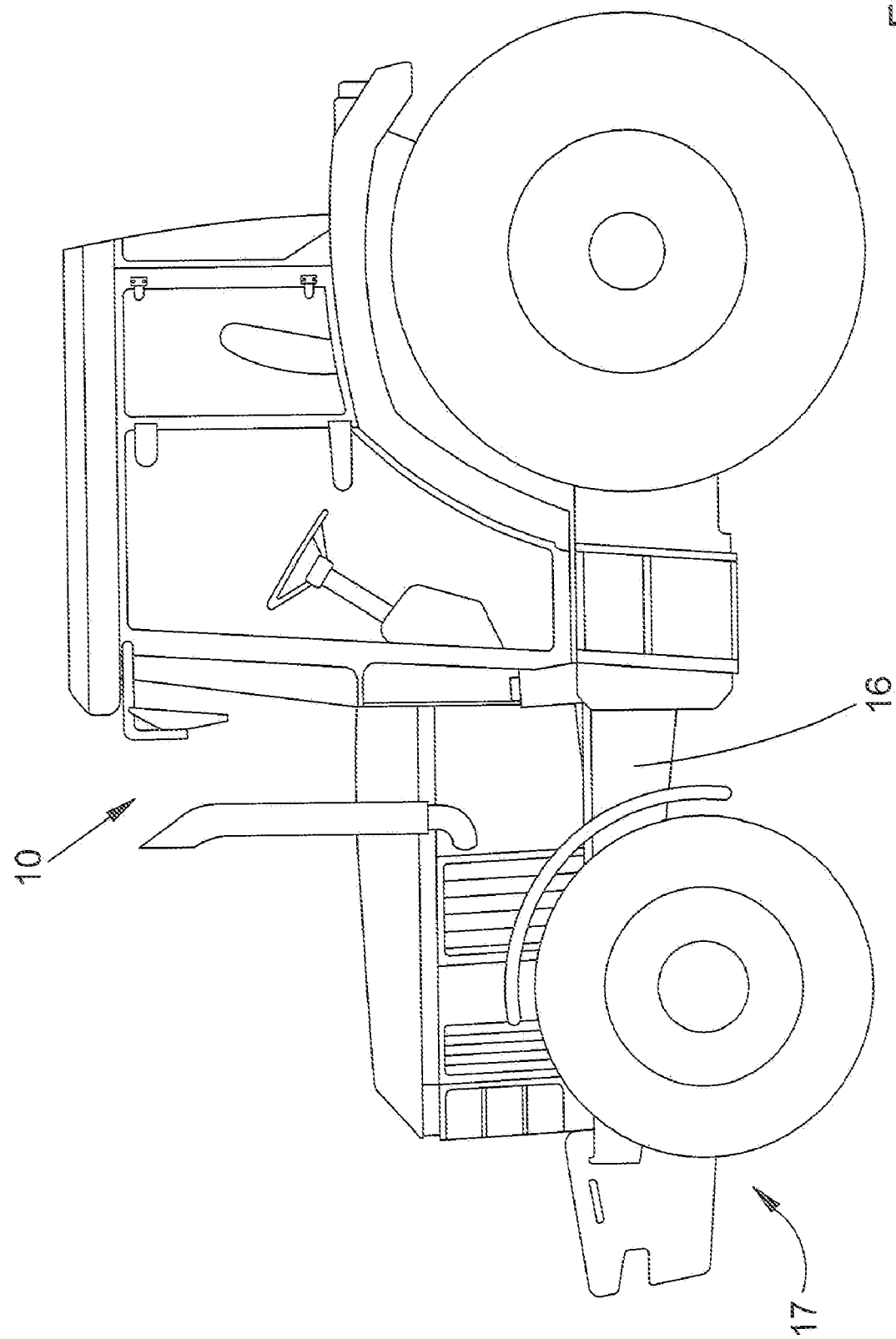
FIG. 1 is a schematic side view of an agricultural vehicle with a stop valve arranged in a hydraulic system.

FIG. 1 shows an agricultural vehicle 10 in the form of a tractor or hauler that includes a hydraulic system 12, 14, 15 as shown in FIGS. 2a, 2b, 3a, 3b, and 4a, 4b. The hydraulic systems of FIGS. 2a and 2b, 3a and 3b, as well as 4a and 4b, are described only as examples in connection with the tractor and can be used in the same way also in other agricultural vehicles, such as harvesting machines, crop-protection machines, planting and sowing machines, or else also in construction and forestry machines.

The vehicle 10 includes a frame 16 on which, in a front region 17, a front axle (not shown) is supported by a hydraulic front-axle suspension (not shown). The hydraulic front-axle suspension includes one of the hydraulic systems 12, 14, 15 according to FIGS. 2a and 2b, 3a and 3b, as well as 4a and 4b. These hydraulic systems 12, 14, 15 can also be used in connection with other hydraulically operated components and devices on the vehicle 10.

In each of FIGS. 2a and 2b, a stop cock or stop valve 18 in the form of a ball cock or ball valve is arranged in a hydraulic line 19 of the hydraulic system 12. The hydraulic line 19 is used, for example, for supplying the hydraulic suspension (not shown) of the vehicle 10 of FIG. 1.

The stop valve 18 includes a valve housing 20 and a valve slide 22 that can be activated manually by a lever (not shown) or by a motor driven adjustment unit (not shown). The valve slide 22 is constructed as a ball and is supported in a correspondingly spherical interior of the valve housing 20 so that it can rotate. The housing 20 has a first connection or port 24 and a second port 26 which are connected to the hydraulic line 19. The valve slide 22 has a central bore 28 that connects the first and second ports 24, 26 of the valve housing 20 to each other in an open position according to FIG. 2b of the valve slide 22, wherein, in this open position, a maximum opening cross section is created between the first and the second ports 24, 26.

The stop valve 18 has a blocking device 29. The blocking device 29 includes a recess 30 or groove formed on the valve slide 22 (this recess or groove could also be formed as a bore, cutout, countersunk section, depression, or the like). The blocking device 29 is further constructed so that the valve housing 20 is connected to an adjustment cylinder 34 by means of a cylindrical connection channel 32. In the cylindrical connection channel 32, a blocking element 36 is arranged in the form of a cylindrical lock bar that can project via a first opening 38 into the interior of the adjustment cylinder 34 and via a second opening 40 into the interior of the valve housing 20, wherein the blocking element 36 can engage with the recess 30 as soon as this is guided through the second opening 40 into the interior of the valve housing 20. The blocking element 36 has a cam-shaped control head 42 on which the adjustment piston 44 can engage, wherein this adjustment piston 44 is supported so that it can move in the adjustment cylinder 34 and wherein the adjustment piston 44 includes first and a second adjustment piston heads 46, 48 that each limit, on the ends, with end walls 50, 52 of the adjustment cylinder 34, a control pressure chamber 54, 56, wherein the control pressure chambers 54 are connected hydraulically on the output side and the control pressure chamber 56 is connected hydraulically on the input side by the stop valve 18 to the hydraulic line 19. Between the adjustment piston heads 46, 48, the adjustment piston 44 is provided with a rotationally symmetrical indentation 58, so that the cam-shaped control head 42 of the blocking element 36 can project through the first opening 38 between the adjustment piston heads 46, 48 into the interior of the adjustment cylinder 34 (see FIG. 2b). For this purpose, the blocking element 36 is biased in the cylindrical connection channel 32 with a spring 60 in the direction of the adjustment cylinder 34, so that the blocking element 36 must be moved by the adjustment piston heads 46, 48 through the second opening into the interior of the valve housing 20. If the same pressure now prevails in the two control pressure chambers 54, 56, then the adjustment piston 44 assumes a middle position (see FIG. 2b) in which the blocking element 36 is located with its control head 42 in the interior of the adjustment cylinder 34. If a pressure difference is now set between the control pressure chambers 54, 56, then the adjustment piston 44 moves in the direction of a corresponding end side of the adjustment cylinder 34, whereupon the cam-shaped control head 42 of the blocking element 36 is pressed or moved by the corresponding adjustment piston head 46 or 48 through the second opening 40 into the interior of the valve housing 20. Simultaneously, the blocking element 36 engages with the recess 30 and blocks the valve slide 22 from rotating into an open position or limits an activation of the valve slide 22 to a rotation into an intermediate position according to FIG. 2a in which only a fraction of the opening cross section of the first and second connections is achieved or the stop valve is only partially opened. Only when a pressure balance between the two control pressure chambers 54, 56 has been achieved again through slow and controlled flow through the bore 28 or the first and second ports 24, 26 is the blockage by the valve slide canceled, in that the adjustment piston 34 moves into its middle position and the blocking element 36 is moved by the spring 60 into the interior of the adjustment cylinder 34 between the adjustment piston heads 44, 46, whereupon the valve slide 22 can be rotated into an open position with a maximum opening cross section according to FIG. 2b. Obviously, the valve slide 22 can be rotated into a closed position at any time (not shown), with this position being set as soon as there is no overlap of the openings of the borehole 28 of the valve slide 22 and the first or second connection 24, 26. Furthermore, as in the case of stop ball cocks, an advantageously two-sided stop (not shown) is provided on the valve housing 20, wherein this stop ensures that, first, the valve slide 22 cannot rotate past its opening position and closed position and, second, this valve slide can rotate only in one direction starting from the closed position or open position.

An alternative or additional embodiment is shown in FIGS. 3a and 3b, where in place of a hydraulic drive or control, an electronic drive or control of the blocking device 29 is included. The valve housing 20, the valve slide 22 with the same recess 30, the adjustment cylinder 34, the adjustment piston 44 with its adjustment piston heads 46, 48, and the indentation 58, the connection channel 32 with the blocking element 36 and spring 60, as well as all of the components relevant in this respect according to FIGS. 2a and 2b were kept. The essential difference consists in that the control pressure chambers 54, 56 are eliminated and the adjustment piston 44 is not moved directly due to a pressure difference in the control pressure chambers 54 formed in the adjustment cylinder 34, but instead the adjustment piston 44 is moved by electrically operated adjustment means or actuator 62, preferably a step motor. Furthermore, a pressure sensor 64 detects the pressure in the hydraulic line 19 and is arranged on the side of the first connection 24 of the stop valve 18, and a pressure sensor 66 for detecting the pressure in the hydraulic line 19 is arranged on the side of the second connection 26 of the stop valve 18. Both pressure signals are transmitted to an electronic control unit 68 that generates, in turn, a control signal for the electrically operated adjustment means. The step motor 62 is connected, for example, via an adjustment spindle 70, to the adjustment piston 44, wherein it moves the adjustment piston 44 as a function of the pressure differences between the pressure sensors 64, 66 analogous to the hydraulically controlled blocking device 29 from FIGS. 2a and 2b, wherein the blocking element 36 is moved accordingly by the movement of the adjustment piston 44 from an engaged position with the recess 30 into a position in which the blocking element 36 is located with its control head 42 in the interior of the adjustment cylinder 34.

Figure 4A:
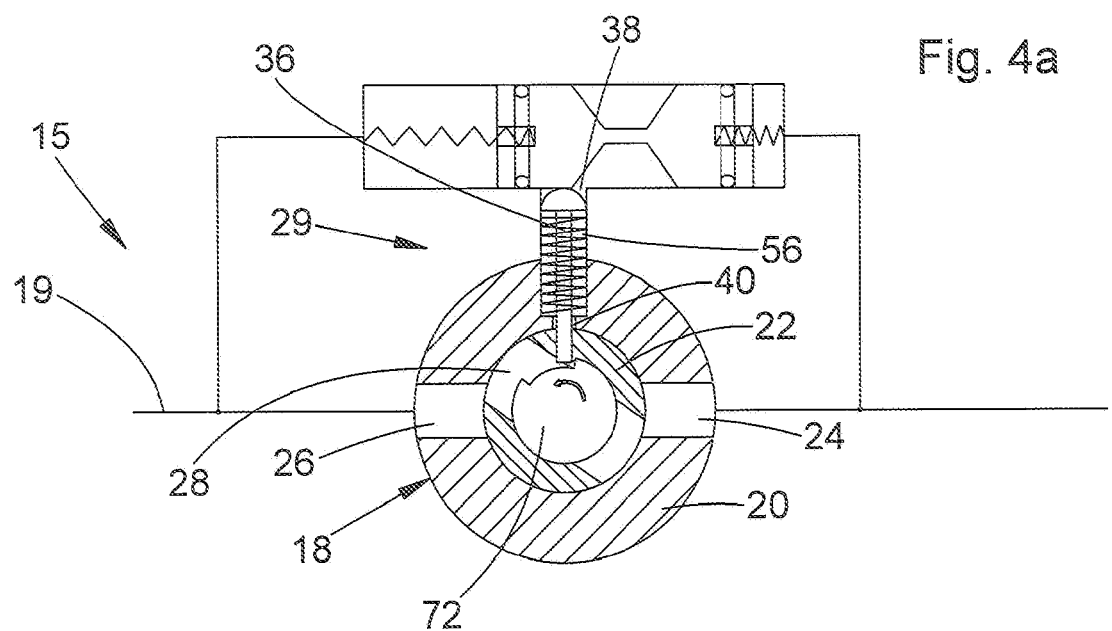
FIG. 4a is a hydraulic system schematic diagram of an additional embodiment of a stop valve according to the invention in an intermediate position with hydraulically controlled blocking device.
Figure 4B:
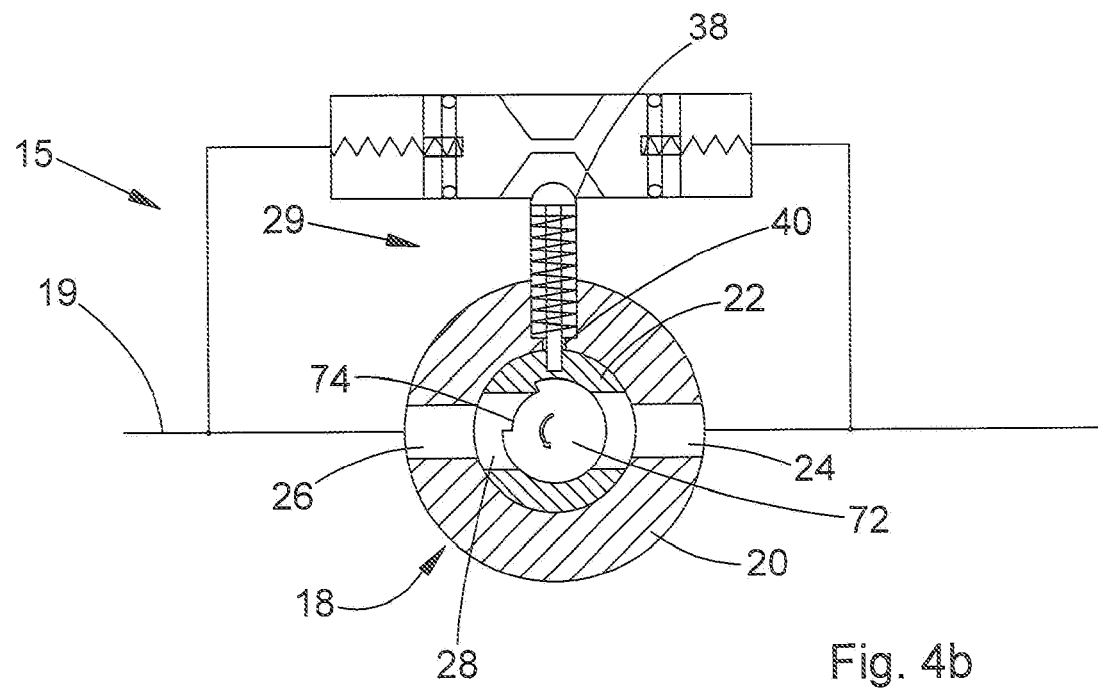
FIG. 4b is a hydraulic system schematic diagram of the embodiment according to FIG. 4a with the stop valve in an open position.

An additional embodiment is shown in FIGS. 4a and 4b, wherein this embodiment is based on hydraulic control of the blocking device 29 according to FIGS. 2a and 2b. The difference here consists in that the arrangement of the blocking device 29 is somewhat changed to the extent that, in place of the recess 30 from the FIGS. 2a, 2b, 3a, 3b, with the recess being formed there directly on the rotating valve slide 22, in which, in the example shown in FIGS. 4a and 4b, a valve slide element 72 in the form of a circular disk was selected, wherein the valve slide element 72 is locked in rotation with the valve slide 22. The circular disk can be constructed, for example, on an adjustment shaft connected to the valve slide or can be locked in rotation with this adjustment shaft. The connection channel 56 and also the arrangement of the blocking element 36 is arranged such that this can be brought into engagement with a recess 74 constructed on the valve slide element 72 (circular disk) in the form of a circular arc cutout through movement in the way described according to FIGS. 2a and 2b. The other components, as well as the function of the embodiment described with reference to FIGS. 4a and 4b, is identical to the embodiment described with respect to FIGS. 2a and 2b.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A hydraulic system stop valve having a valve slide movable to a closed position and an open position, characterized in that:
   a blocking device limits activation of the valve slide at an intermediate position located between the closed position and the open position, wherein, in the intermediate position, the opening cross section of the stop valve equals only a fraction of the opening cross section of the open position, wherein the blocking device is controlled as a function of a pressure difference between a pressure in front of and a pressure behind the stop valve, and wherein the blocking device is deactivated when the said pressure difference falls below a given pressure difference.

2. The stop valve of claim 1, wherein:
the blocking device comprises a blocking element which is engagable with the valve slide in order to limit the activation of the valve slide.

3. The stop valve of claim 1, wherein:
the valve slide is constructed as a rotary slide valve which is rotatable into an open position from an intermediate or closed position.

4. The stop valve of claim 1, wherein:
the stop valve is constructed as a ball valve, and the valve slide is constructed as a ball-valve slide which is rotatable from a closed position into an open position or an intermediate position.

5. The stop valve of claim 2, wherein:
the blocking element is adjusted by an adjustment piston controlled hydraulically as a function of the pressure difference, wherein the blocking element can be moved by the adjustment piston into a blocking position in which the blocking element engages with the valve slide and limits the activation of the valve slide in the direction of the open position up to the intermediate position.

6. The stop valve of claim 2, further comprising:
an electronic actuator for adjusting the blocking element as a function of the pressure difference, wherein the blocking element can be moved by the actuator into a blocking position wherein the blocking element engages the valve slide and limits the activation of the valve slide in the direction of the open position up to the intermediate position.

7. The stop valve of claim 5, wherein:
the blocking element is constructed as a lock bar, and a recess is formed in the valve slide, wherein the lock bar engages in the recess and blocks further rotation of the valve slide in the direction of the open position past the intermediate position.

8. The stop valve of claim 1, wherein:
the blocking device comprises a blocking element which is engagable with a valve slide element connected to the valve slide, in order to limit the activation of the valve slide.

* * * * *